April 6, 1948.   H. S. INDGE   2,439,303
CENTERLESS GRINDER
Filed March 16, 1946   2 Sheets-Sheet 1

Inventor
HERBERT S. INDGE
By George Crampton
Attorney

Inventor
HERBERT S. INDGE

Patented Apr. 6, 1948

2,439,303

UNITED STATES PATENT OFFICE 2,439,303

CENTERLESS GRINDER

Herbert S. Indge, Westboro, Mass., assignor to Norton Company, Worcester, Mass., a corporation of Massachusetts Application March 16, 1946, Serial No. 654,863

6 Claims. (Cl. 51—48)

1

The invention relates to centerless grinding machines.

One object of the invention is to provide a machine of a character indicated particularly adapted to grind simultaneously the edges of a number of thin plates, stones, jewels, etc., by temporarily cementing them together into a single workpiece and applying at each end of such workpiece a template or guide of size and shape equal to the final size and shape of the workpiece. Another object of the invention is to provide a centerless grinding machine for grinding a number of pieces of work to the same shape and size in one operation. Another object of the invention is to provide a machine for simultaneously grinding a number of pieces of work in a single operation. Another object of the invention is to provide a machine of the character indicated in which a number of pieces of work may be automatically held and rotated against a grinding surface. Another object is to provide a machine for accurately contouring a number of objects to the same contour and, in the same operation, giving them a good surface finish.

Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings in which is shown one of various possible embodiments of this invention;

Figure 1:
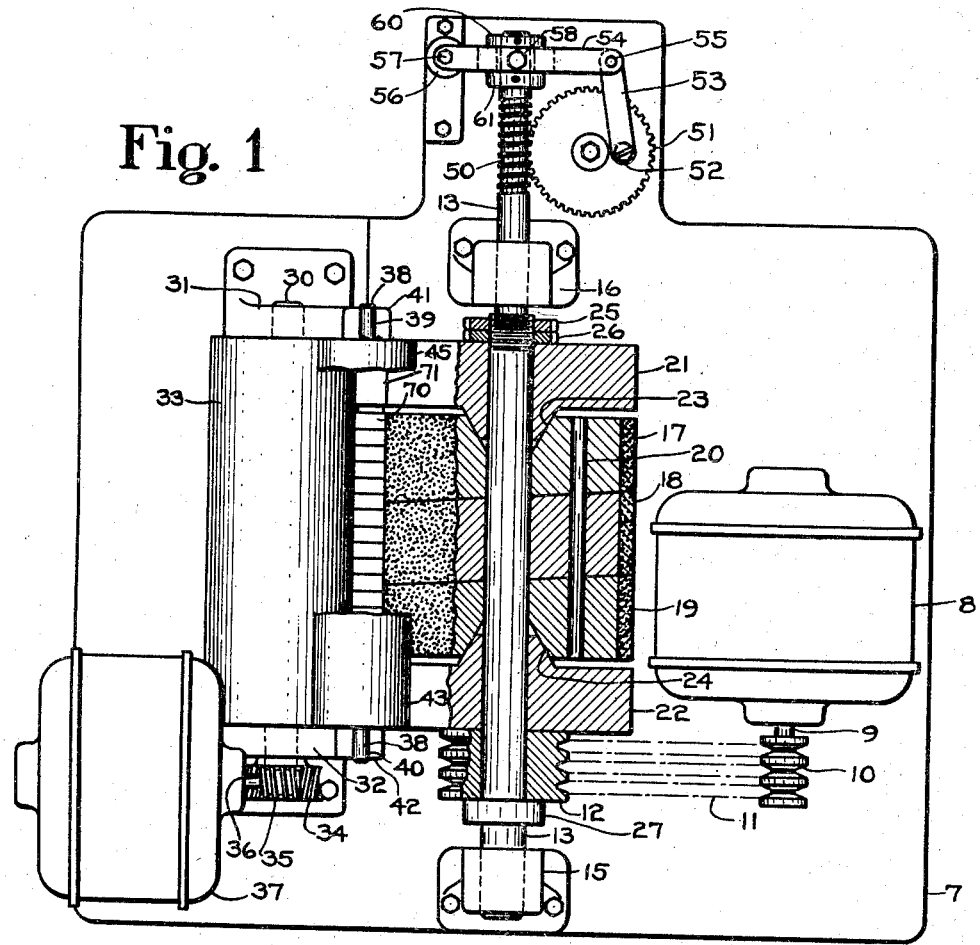
Figure 1 is a plan view of a machine constructed in accordance with the invention.
Figure 2:
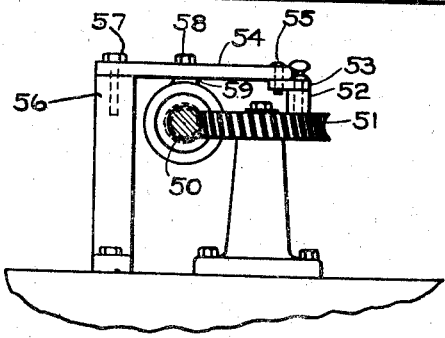
Figure 2 is a fragmentary rear elevation of the machine showing the end of the grinding wheel spindle and oscillating mechanism therefor.
Figure 3:
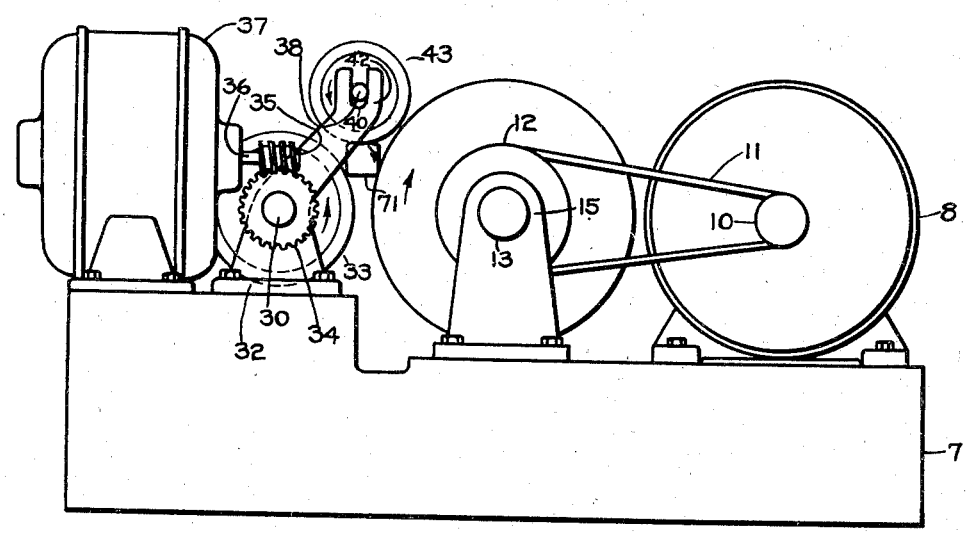
Figure 3 is a front elevation of the machine.
Figure 4:
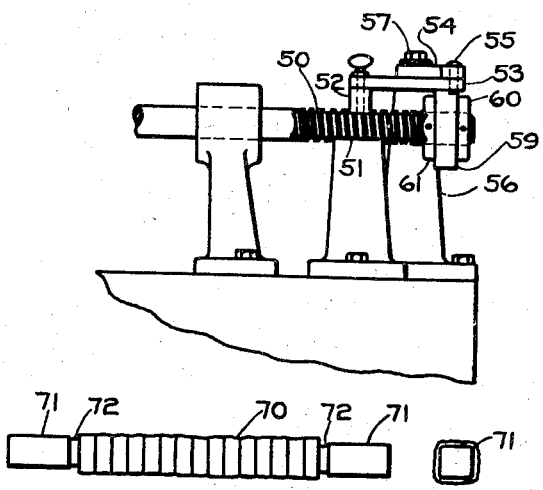
Figure 4 is a side elevation of the rear of the machine, further illustrating the spindle oscillating mechanism.

Referring to Figures 1 and 3 the machine is mounted upon a base 7. Mounted on the base 7 is an electric motor 8 upon the armature shaft 9 of which is a pulley 10 driving, by means of belts 11, a pulley 12 fastened to a grinding wheel spindle 13. The spindle 13 is rotatably mounted in a pair of journals 15 and 16. Upon the spindle

2

13 are mounted a series of grinding wheels (three being shown) 17, 18, and 19 which are surfaced with metal bonded diamonds or other suitable abrasive material. These grinding wheels are bolted together by bolts 20 (one being shown) to form a continuous cylindrical grinding surface. These grinding wheels are secured together in this manner to form a continuous abrasive surface because it has been found impossible to make metal bonded diamond grinding wheels of the overall axial dimension required.

Compressed against the grinding wheel assembly at either end are a pair of non-grinding master rollers 21 and 22 of diameter equal to that of the grinding wheels. The master rollers 21 and 22 have conical surfaces 23 and 24 which fit into similarly shaped recesses in the diamond wheels 17 and 19 at either end of the grinding wheel assembly in order accurately to align the grinding wheels with the rollers. The master rollers 21 and 22 are compressed against the grinding wheel assembly by means of a pair of threaded nuts 25 and 26 on a threaded portion of the spindle 13, and an integral collar 27 on the spindle beyond the pulley 12, thus providing a means for strongly and simply securing the master rollers 21 and 22 and the grinding wheel assembly 17, 18 and 19 to the spindle 13. The spindle 13 and grinding wheel assembly 17, 18 and 19 and master roller 21 and 22 are driven at a speed of the order of 600 to 1000 revolutions per minute.

Mounted upon the base 7 and parallel to the axis of the grinding wheel spindle 13 is a shaft 30 which is journalled in a pair of journal brackets 31 and 32. Mounted upon the shaft 30 is a feed wheel roller 33 made of soft rubber which is affixed securely to the shaft 30 to rotate with it. Mounted securely upon the end of shaft 30 to drive it is a worm wheel 34 which is driven by a worm gear 35 mounted upon the shaft 36 of an electric motor 37 which is mounted upon the base 7 of the machine. The feed roller 33 is driven at a speed of the order of 10 revolutions per minute. The feed roller 33 is mounted at such a distance from the grinding wheel assembly 17, 18, and 19 and master rollers 21 and 22 that work may be placed on and between the feed roller 33 and the grinding wheel assembly.

Referring to Figure 3, the feed roller 33 rotates counterclockwise, that is upwardly through the grinding throat, and drives the workpiece clockwise. The wheels 17, 18, and 19 also rotate upwardly in the grinding throat that is clockwise.

Rotatably mounted on a shaft 38 which rotates in slots 39 and 40 in upper bracket extensions 41 and 42 of journal brackets 31 and 32 is a heavy rubber pressure roller 43 of a diameter of the order of less than half that of the grinding wheel assembly 17, 18, and 19 and its master rollers 21 and 22. When work is placed on and between grinding wheel assembly 17, 18, and 19 and feed roller 33 this pressure roller 43 rides on the work, holds it against the grinding surface 17, 18, 19 and also against the rubber feed roller 33.

Referring to Figures, 1, 2, and 4, mounted upon one end of the grinding wheel spindle 13 is a worm 50 which drives a worm wheel 51. A crank pin 52 on the worm wheel 51 reciprocates a link 53 which reciprocates a lever 54 connected to the link 53 by means of a pin 55. Lever 54 moves angularly upon a post 56 and is connected to it by a pivot pin 57. Lever 54 is also connected by a pin 58 to shoe 59 which fits around spindle 13 between two collars 60 and 61 pinned to spindle 13, so that shaft 13 rotates in shoe 59 and is reciprocated rectilinearly along its axis slowly by the reciprocation of shoe 59 against collars 60 and 61. The grinding surface of the assembly 17, 18, and 19 thus moves rectilinearly against the work as well as rotationally, and thus insures the preservation of an even surface on the grinding surface which might otherwise be grooved by a number of hard work pieces against it. The reciprocation or oscillation of the wheels 17, 18 and 19 also breaks up the grinding to procure polished surfaces on the workpieces.

Figures 5, 6:
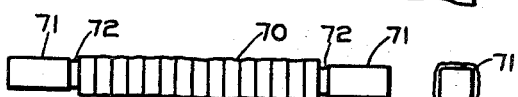
Figure 5 is a side view of an assembly of workpieces and templates or guides.
Figure 6 is an end view of the assembly of Figure 5.

Referring to Figures 5 and 6 and also to Figures 1 and 3, a number of plates, stones, jewels, simple cams or similar pieces of work 70 which it is desired to grind to exact uniform dimensions are temporarily cemented together by a suitable bonding material, to form a single workpiece or assembly. A pair of guides, or templates 71 of exactly equal dimensions and of the size and shape to which it is desired to grind the cemented work pieces or assembly 70 simultaneously, are cemented to the ends of the work assembly 70 in the same angular position. The templates 71 have reduced spacing portions 72 to prevent grinding of the templates and to prevent the workpieces from resting on the rollers 21 and 22. Figures 5 and 6 show the workpieces 70 before grinding while Figures 1 and 3 show the workpieces 70 at the end of the grinding operation.

Enough pieces of work are cemented together for an operation to make a single work assembly 70 to be ground of nearly equal length to the length of the total grinding surface of the grinding wheel assembly 17, 18 and 19 as shown. The work assembly 70 and templates 71 thus comprise a single unit which is placed on and between the rubber feed roller 33, and the grinding wheel assembly 17, 18 and 19, as shown, so that each of the templates 71 will ride opposite one of the master rollers 21 and 22. Pressure roller 43 is then placed in the slots 39 and 40 to ride upon the work assembly 70 and hold it down. Driving motors 11 and 37 are then energized. As the grinding surface of grinding wheel assembly 17, 18, and 19 revolves and reciprocates rectilinearly along its axis against the work assembly 70 it grinds the pieces cemented together in the assembly 70 uniformly.

The rubber feed roller 33 rotates in a direction opposite to that of the grinding wheel assembly 17, 18, and 19 which is the same as saying that both the roller 33 and the wheels 17, 18 and 19 move in the same direction in the grinding throat, preferably upwardly. The rubber roller 43 acts as a weight, and of course rotates with the work. The rotation of the workpiece 70 is irregular. While the roller 33 tries to rotate it, the grinding wheels may temporarily stop its rotation, but the action of both the wheels and the roller 33 tend to lift the work so that the roller 33 may turn it slightly. In some cases the workpiece is nearly finished in the course of a single revolution thereof. However grinding and polishing continues until the weight of the assembly 70 is taken by the templates 71 bearing against the rollers 21 and 22.

Only one of the limitless number of shapes and dimensions of the master forms, guides or templates 71 to which a number of pieces or work may be ground in this machine is shown. Jewels, stones, small cams, plates and the like may be cheaply, uniformly and expeditiously produced in mass by this apparatus in a simultaneous automatic operation. Because the apparatus ceases to grind when the desired dimensions are reached, a number of these machines can be easily tended by one operator for mass production purposes.

It will thus be seen that there has been provided by this invention a method and an apparatus in which the various objects hereinabove set forth together with many thoroughly practical advantages are successfully achieved.

As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

I claim:

1. An apparatus for simultaneously grinding a number of workpieces to a uniform shape and dimension with automatic control comprising a cylindrical grinding wheel, means to rotate said wheel, a feed roller parallel to the axis of said grinding wheel to rotate said workpieces against said grinding wheel to grind them all around, means to drive said feed roller, a free running roller parallel to the axes of said grinding wheel and feed roller to press said workpieces against said feed roller and grinding wheel, a pair of non-grinding guide rollers at either end of said grinding wheel of diameter equal to it, a pair of templates or form guides of the size and dimension required of said workpieces which may be cemented to the ends of a work assembly so that when said work assembly is placed against said grinding wheel and feed roller, said templates will ride opposite said non-grinding guide rollers at the ends of said grinding wheel and ride upon them to prevent further grinding of the workpieces when they are ground to the same shape as said templates, and a spindle reciprocator to reciprocate said grinding wheel shaft rectilinearly along its axis.

2. An apparatus for simultaneously grinding a number of workpieces which are temporarily cemented together to form a column into a uniform shape and size with an automatic control to stop said grinding operation after said workpieces are ground to said size and shape, comprising a cylindrical grinding wheel, a feed roller to feed said column of workpieces to the grinding surface, hold it parallel to said grinding surface and rotate it against said grinding surface, a pair of guide templates which are cut to the size and shape to which it is desired to grind said workpieces and cemented to the ends of the column of said workpieces, and a pair of non-grinding guide rollers of the same diameter as said grinding wheel at each end thereof upon which said guide templates ride to prevent further grinding when said workpieces are ground to the size of said guide templates.

3. In an apparatus of the class described, a grinding wheel having an exterior cylindrical grinding surface, means to rotate said grinding wheel about its axis at a relatively high speed, a feed wheel having an exterior cylindrical surface mounted with its axis parallel to the axis of the grinding wheel and close enough to it to form a grinding throat for grinding workpieces of diameter less than the grinding wheel and less than the feed wheel, means to rotate said feed wheel about its axis at a relatively slow speed and in an angular direction opposite to that of the grinding wheel, a third wheel having an exterior cylindrical surface, and a guide for the third wheel locating it on one side of the throat and substantially parallel to the axes of the grinding wheel and feed wheel but permitting movement into and away from the throat.

4. In apparatus as claimed in claim 3, the combination with the parts and features therein specified, of rollers coaxial with the grinding wheel, one on each end thereof, to form a stop for engagement with templates secured to a workpiece to limit the grinding.

5. In apparatus as claimed in claim 3, the combination with the parts and features therein specified, of means to rotate said grinding wheel and said feed wheel so that the direction of motion of the surfaces of both of said wheels through the grinding throat is toward the third wheel.

6. In apparatus as claimed in claim 3, the combination with the parts and features therein specified of a spindle reciprocator to reciprocate the grinding wheel along its axis and against said workpieces as said grinding wheel rotates.

HERBERT S. INDGE.

REFERENCES CITED

The following references are of record in the file of this patent:

UNITED STATES PATENTS

| Number | Name | Date |
|---|---|---|
| 1,048,658 | Clark | Dec. 31, 1912 |
| 1,191,874 | Day | July 18, 1916 |
| 1,778,977 | Kosfeld | Oct. 21, 1930 |
| 2,010,922 | Leonard | Aug. 13, 1935 |
| 2,012,078 | Binns | Aug. 20, 1935 |